UNITED STATES PATENT OFFICE.

CURT SCHMIDT, OF FREIENWALDE-ON-THE-ODER, GERMANY.

RADIO-ACTIVE MATERIAL.

1,032,951.      Specification of Letters Patent.      Patented July 16, 1912.

No Drawing. Original application filed January 10, 1911, Serial No. 601,927. Divided and this application filed December 8, 1911. Serial No. 664,578.

*To all whom it may concern:*

Be it known that I, CURT SCHMIDT, a subject of the German Emperor, works director of Alum Works, near Freienwalde-on-the-Oder, Germany, have invented certain new and useful Improvements in Radio-Active Materials; and I do hereby declare the following to be a full, clear, and exact description of the invention, such as will enable others skilled in the art to which it appertains to make and use the same.

The invention relates to a radio-active material, and is designed to render other solid bodies, gases or liquids radio-active by emanation, and is a division of my application Serial No. 601,927, filed January 10, 1911.

Radio-active materials already exist, in which the radio-active substance proper is mixed with inert bodies and forms together with said bodies a porous whole. These masses have the disadvantage, that many radio-active substances consist of ores or powdered residues obtained in the treatment of uranium compounds, which under ordinary circumstances are easily dissolved by liquids and color said liquids. This is obviated by the invention described in my above-named application by mixing the radio-active substances with a binding agent such as clay or loam, which, when subjected to a burning process, forms with the radio-active substances solid radio-active bodies of a highly porous structure, from which said substances are not dissolved by ordinary liquids.

The essential feature of the present invention consists in a process of forming porous bodies of clay, or a substance containing clay, as loam, or coating vessels with such binding agents and then washing the same with a liquid having radio-active substances dissolved therein, before proceeding to the burning process. The advantage of this process is, that such bodies, especially such vessel coatings can be produced in an extremely simple and cheap manner, and such a material has the advantage that the radio-active substance proper cannot be dissolved out of the porous mass after firing by ordinary liquids, and that the liquid is not colored, which is desirable if such liquid is to be used as a drink or for the exterior treatment of the human body. By placing liquids or medicaments, to be taken internally, in the vessels they are rendered active without being colored by or dissolving the radio-active substance of the vessel.

The radio-active material is produced as follows: A portion of clay, loam or other earthy substance is shaped or formed into a body having a large surface adapted to be put into a vessel or into a bottle, or is shaped to some similar body or vessel; or a bottle or other vessel is coated with it. If it is desired to obtain a high degree of porosity, carbon or saw-dust may be mixed with the clay or loam, which is driven off in the burning process. After that the porous body so formed is rinsed or washed with a liquid in which the radio-active substance is dissolved, so that the material of which the vessel or the like or the coating is formed will absorb such substance. If walls or baths or other vessels are made of tiles or plates, these can be treated in the manner described. Finally, these bodies are subjected to a burning process in well known manner. If entire vessels, such as bottles, tumblers, jugs or the like are produced, their exterior surfaces can be glazed. Further, the stoppers or lids can be produced from this substance.

In such cases in which, for example, clay or loam-like materials have themselves a radio-active property, it is of course not necessary to wash them with other radio-active liquids before burning.

The bodies may receive a different degree of radio-activity by suitably choosing the concentration of the radio-active solution.

Claims—

1. Process for producing radio-active materials, which comprises forming argillaceous substances into suitable forms, then rinsing or washing the same with radio-active liquids and finally burning them.

2. Process for producing radio-active materials, which comprises washing a vessel of an argillaceous substance with a radio-active liquid and finally burning the vessel and glazing its exterior.

3. Process for producing radio-active materials, which comprises washing a vessel of an argillaceous substance with a radio-active liquid and burning the vessel to cause the radio-active substance of the liquid to be fire-united to the vessel.

In testimony that I claim the foregoing as my invention, I have signed my name in presence of two subscribing witnesses.

CURT SCHMIDT.

Witnesses:
WOLDEMAR HAUPT,
HENRY HASPER.